Feb. 26, 1957 J. G. FONTAINE ET AL 2,783,303

TELEPHONE ANSWERING AND RECORDING DEVICES

Filed Sept. 25, 1951 4 Sheets-Sheet 1

INVENTORS
JOHN GARFIELD FONTAINE
ALLAN DAVIDSON McLEAN
Ernest E. Carver
ATTORNEY Feb. 26, 1957 J. G. FONTAINE ET AL 2,783,303

TELEPHONE ANSWERING AND RECORDING DEVICES

Filed Sept. 25, 1951 4 Sheets-Sheet 2

INVENTORS
JOHN GARFIELD FONTAINE
ALLAN DAVIDSON McLEAN

Ernest E. Carver
ATTORNEY

TELEPHONE ANSWERING AND RECORDING DEVICES

INVENTORS
JOHN GARFIELD FONTAINE
ALLAN DAVIDSON McLEAN
Ernest E. Carver
ATTORNEY

Feb. 26, 1957 J. G. FONTAINE ET AL 2,783,303

TELEPHONE ANSWERING AND RECORDING DEVICES

Filed Sept. 25, 1951 4 Sheets-Sheet 4

INVENTORS
JOHN GARFIELD FONTAINE
ALLAN DAVIDSON McLEAN

Ernest F. Carver
ATTORNEY 2,783,303

TELEPHONE ANSWERING AND RECORDING DEVICES

John Garfield Fontaine and Allan Davidson McLean, Vancouver, British Columbia, Canada, assignors to Automatic Phone Recorder Co. Ltd., Vancouver, British Columbia, Canada, a British company Application September 25, 1951, Serial No. 248,164

4 Claims. (Cl. 179—6)

Our invention relates to improvements in telephone answering and recording devices.

The objects of the invention are to provide an answering and recording device which serves general office purposes such as taking and recording dictation, and which is also capable of being adapted, by the simple expedient of operating a switch, for responding to the sound of a telephone bell for answering the telephone, receiving and recording the message from the caller and for reproducing the message when required. Other objects of the device are to register the number of calls received automatically; to prevent the recording of the sound of the call bell of the telephone; to enable a message to be recorded on the tape for transmission to the caller, and to enable the caller's message to be erased and replaced while leaving the message to caller impressed on the tape, so that the user to caller message may remain as a permanent record, or remain on record until the user desires to change it.

Referring to the drawings.

In the drawings like characters of reference indicate corresponding parts in each figure.

Figure 1:
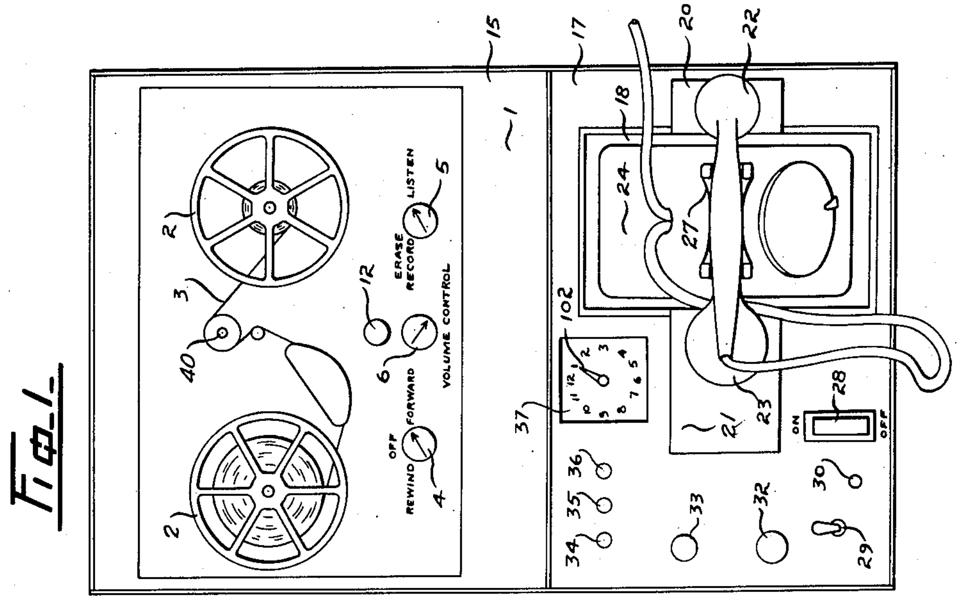
Figure 1 is a plan view of the invention showing the top panel of the tape recorder and the disposition of a handset type telephone instrument supported in message receiving position.

The numeral 1 indicates generally the top panel of a tape recording machine having tape reels 2, a tape 3 and control knobs 4, 5 and 6, each having a pointer to be turned to indicia upon the panel. The knob 4 serves to start the machine in a "forward" or "rewind" direction, or to stop it. The knob 5 serves to switch the recorder from "listen" to "erase and record." The knob 6 serves to control the volume of the speaker 8, see Figure 2.

Figure 5:
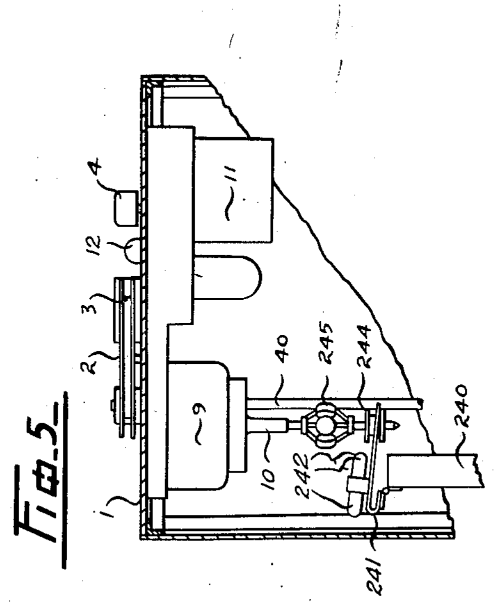
Figure 5 is a detail sectional view showing the governor controlled switch in the sound circuit.
Figure 3:
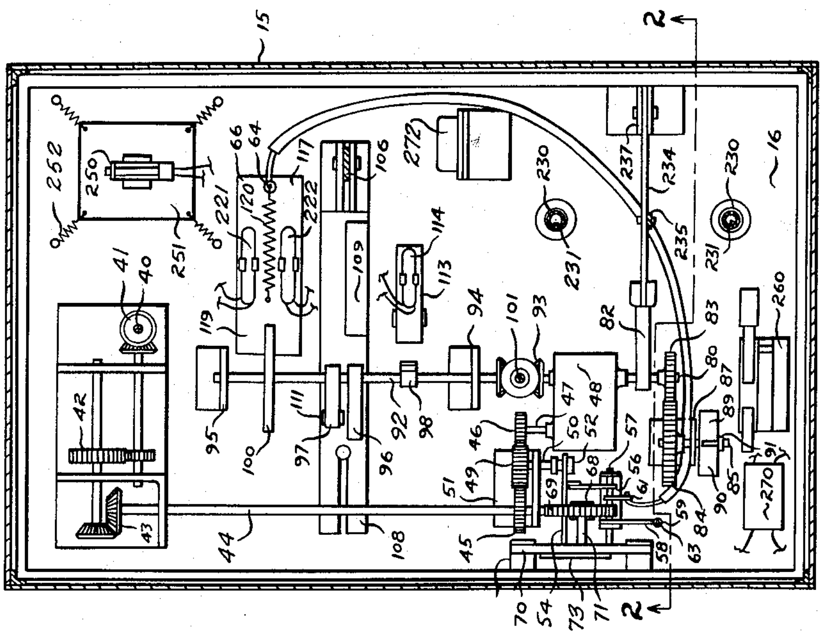
Figure 3 is a sectional plan view showing the mechanical drive for the operation of the timing devices.

The tape recorder is provided in the conventional manner with a motor 9, see Figure 5, having a drive shaft 10, an amplifier set 11 and a volume indicating light 12, see Figure 1. The tape recorder may be a standard machine, such as is used in business organizations for recording dictation to be transcribed later and may be used as such per se if desired. The tape recorder is set in a casing 15 which has a base panel 16 and an upper panel 17 provided with a recess 18 to accommodate a telephone instrument of the handset type, see Figures 1 and 2. Bordering on the recess 18 is a microphone 20 and a speaker screen 21 upon which the receiver 22 and the transmitter 23 of the handset 24 are adapted to rest when the handset is raised relative to the button 25 of the telephone base 27. A normally closed main switch 28, preferably of the sliding type, is mounted on the panel 17, as is also a switch 29, a push button normally open switch 30, a transmission gear button 32, signal lights 33, 34, 35 and 36, and also a call recorder dial 37 is disposed for access or exposed to view, on the panel 17. A vertical shaft 40, see Figures 3 and 5, is driven from the motor 9. This shaft serves to drive the tape 3 of the recorder and is fitted with a beveled pinion 41 which drives, through a reduction train 42 and a pair of miter gears 43, a main shaft 44. Adjacent the forward end of the main shaft 44 is a pinion 45, which is adapted to drive a gear wheel 46 and drive shaft 47 of a reduction gear 48 through an idler gear 49. The idler 49 is fitted upon a short shaft 50, which is slidably mounted in a journal 51, see Figure 7, and is fitted with spaced collars 52. A fork 54 engages the shaft between the collars to slide the idler 49 into and out of engagement with the pinion 45 and the gear wheel 46 to establish the drive with the reduction gear 48. The fork 54 is rocked from an upstanding crank 56 fitted to a shaft 57, which shaft is fitted with a horizontal crank 58 having connection with a rod 59 extending through the panel 17 and fitted with the knob 32. A short crank 61 is fitted to the shaft 57 and a push pull wire 63 extends from thence to a high point on a post 64, see Figure 8, which post is erected at the free end of a hinged switch support plate 66, so that when the pinion 45 and gear wheel 46 are coupled by the idler 49, the switch support plate 66 is held by the wire 63 in elevated position as shown in solid lines in Figure 8 and when the reduction gear 48 is disconnected from the main shaft 44, the switch plate 66 is lowered to the position shown in dotted line in Figure 8. The shaft 44 is fitted at its front end as in Figures 2 and 3, with a worm 68 which rotates the worm gear 69 of a distributor switch 70, see Figures 2, 3 and 9. The worm gear 69 is fitted upon a shaft 71 journalled in a frame 72 and on the end of said shaft a finger 73 is fitted having two connected contacts 74 and 75, the contact rides upon an insulated contact ring 76, and the contact 74 rides upon an insulated contact ring 76, and the contact 75 progressively engages insulated contacts 77, which are each connected to the several signal lamps 33, 34, 35 and 36, see diagrammatic view of Figure 13, and the lamps are obviously connected back to the line.

The reduction gear 48 has a take off shaft 80 which extends forwardly and rearwardly and rotates in an anticlockwise direction as seen from the front as in Figure 3. The forward portion of said shaft carries an arm 82 and an pinion 83, which engages a gear wheel 84 which rotates in a clockwise direction. The gear wheel 84 is mounted upon a shaft 85 which is journalled in a standard 87 and said standard carries two slightly spaced semicircular or arcuate contacts 89 and 90. An insulated pointer 91 is connected to one side of the line and is adapted to travel the full length of one arcuate contact, keeping a circuit closed, and pass from it onto the next arcuate contact, which is then not energized. The rear portion of the shaft 80 is coupled to a slow speed shaft 92 through a reversing train 93, thus causing said slow speed shaft to turn in a clockwise direction. The shaft 92 is journalled between standards 94 and 95 and is fitted with radial arms 96, 97 and 98 and a cam 100. A shaft 101 extends vertically from the reversing train 93 and is fitted with a resettable finger 102 which reads upon a dial 37 on the panel 17 and indicates the number of messages received on the device.

Figure 4:
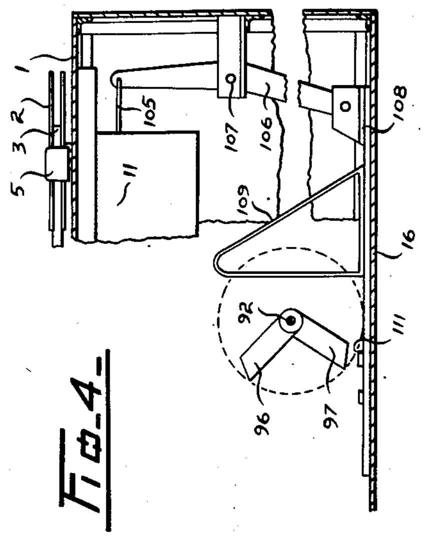
Figure 4 is a detail sectional view showing the mechanism for switching over the tape recorder from listen to erase and record, or vice versa.

The radial arm 96 is adapted to switch the amplifier set 11 to erase and record and turn the knob 5 to erase and record also through the following parts: A rod 105 extends from amplifier set and is connected to the shaft, not shown, on which the knob 5 is fitted. This rod is coupled to the upper end of a lever 106, see details in Figure 4. The lever is fulcrumed intermediate its length as at 107 and is coupled at its lower end to a slide 108. A vertical member 109 is erected upon the slide and is adapted to be engaged by the arm 96 as it descends on its downward swing. The arm 97 is adapted to return the slide 108 to the "listen" position by engaging a lug 111 extending transversely of said slide as the arm sweeps along its understroke, finally lifting to disengage the lug by slipping off the edge of said lug. The radial arm 98 in its swing around the low speed shaft 92 depresses one end of a pivotally mounted switch support 113 to tilt a normally open mercury switch 114 and to close a buzzer circuit 115 to be hereinafter described. The cam 100 upon the shaft 92 has a short step or projection 116 which is adapted to actuate a rocking switch mounting 117 when the shaft 92 is about to come to rest and hold said mounting in the position shown in Figure 8, which mounting consists of a bracket 118 pivotally supporting a platform 119. The platform 119 has at its outer end the pivotally mounted plate 66. A tension spring 120 is anchored at its ends to the platform 119 and the plate 66 to normally hold them in alignment, but the plate 66 may be pulled downwards by the wire 63 to the position shown in dotted line in Figure 8, even though the supporting platform 119 is upwardly held as indicated in solid line in said figure. On the plate 66 two double pole double throw switches 221 and 222 are mounted, which will be again referred to.

Figure 2:
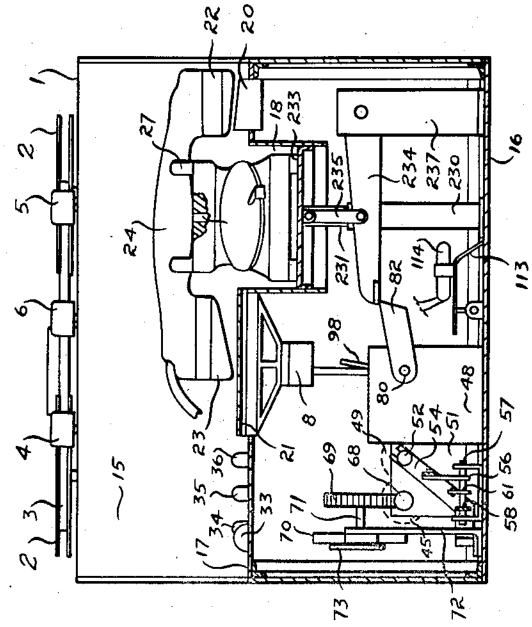
Figure 2 is a transverse sectional view, taken on the line 2—2 of Figure 3.

Mounted below the telephone base recess 18 is a pair of spaced vertical cylinders 230, see Figures 2 and 3, in which plungers 231 are telescopically mounted. These plungers support a platform 233 upon which a handset telephone set may be supported. The vertical travel of the platform is not necessarily more than the length of movement of the button 25 in the cradle 27. A swinging arm 234 is provided below the platform and is connected thereto with a connecting rod 235, one end of the arm is fulcrumed in a post 237 and the opposite end of said arm is adapted to be raised by the radial arm 82 to raise the platform and the telephone base, so that the telephone 24 is resting entirely on the base and the bell circuit in the telephone is closed, leaving it possible for the exchange or a calling instrument to cause the telephone bell to ring.

Mounted below the motor 9 is a member 240 upon which a switch plate 241 is hingedly mounted. This plate is fitted with a mercury switch 242 which is normally closed. The end of the plate 241 is forked to engage a sliding collar 244 upon the motor shaft 10. The collar 244 is connected integrally with a fly ball governor 245 attached to the shaft, so that when the motor starts and the governor 245 lifts the switch plate 241, the switch 242 will be tilted to break the "sound" circuit, which will be hereinafter described.

The numeral 250 indicates a relay, whose coil is energized by the first sound of the telephone bell and is mounted upon a plate 251 which is supported on light springs 252 to prevent its contacts being brought together through vibration or movement close to the device.

Figure 10:
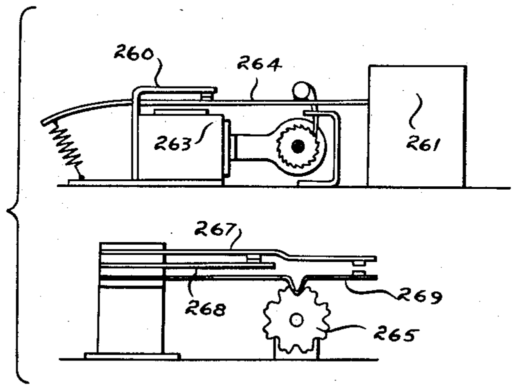
Figure 10 is a view of the ratchet relay and its connections.

The numeral 260 indicates a ratchet relay, see Figure 10, which is provided with a delaying device 261 of any desired type, to provide a predetermined interval of time between successive actuations of the switch. The relay is provided with a coil 263 and an armature 264, which on being energized causes a star wheel 265 to be rotated a given distance to close contacts 267 and 268, or contacts 267 and 269.

A low voltage transformer 270 is connected in the A. C. line and from its secondary winding the circuit 115 extends and in this circuit a buzzer 272 is included. The circuit 115 includes the mercury switch 114, which on being tilted by the rotation of the radial arm 98, becomes closed and causes the buzzer to ring.

Figure 11:
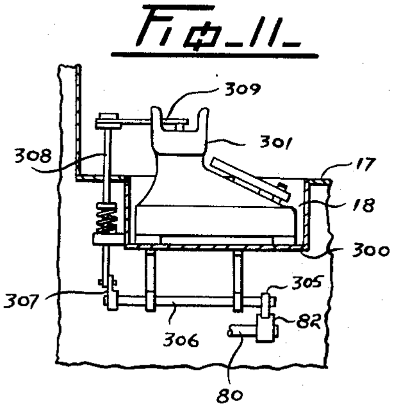
Figure 11 is a sectional view of a modification of the telephone base button switch control to accommodate monophones where the handset receiver and transmitter do not materially overhang the body of the phone.
Figure 12:
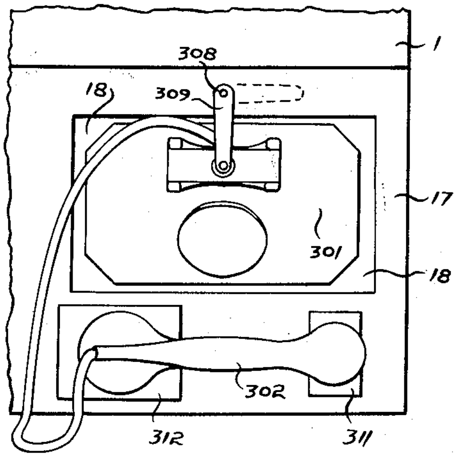
Figure 12 is a plan view of the modification in Figure 11.

In the modification shown in Figures 11 and 12, the recess 18 is provided with a fixed bottom wall 300 to receive a handset type telephone 301 of the type where the handset 302 is of substantially the same length as the telephone base, so that the transmitter and receiver thereof cannot overlie the microphone and speaker of the hereinbefore described recorder. In this case the radial arm 82 is adapted to rock an arm 305 upon a horizontal shaft 306, which shaft is supported below the recess 18 and said shaft is fitted at one end with an arm 307, and the free end of said arm is connected to a vertical rod 308 having a spring to depress said rod when it is not supported by the radial arm 82. The upper end of the vertical rod 308 is rotatably fitted with a horizontal finger 309 which is adapted to normally overlie the button of the telephone base and to depress said button at all times when the telephone is set to receive a message.

The microphone indicated by the numeral 311 is arranged forwardly of the telephone set, and so too is the speaker 312, both of which are suitably spaced so that the telephone handset can be removed from the base of the set and placed upon these two elements to give a caller a message and to record an incoming message from the caller. It will be obvious that when the arm 82 contacts the arm 305 it will cause the rod 308 and the finger 309 to depress the button of the telephone base and leave its bell circuit in condition to be closed in response to a call from outside.

Figure 13:
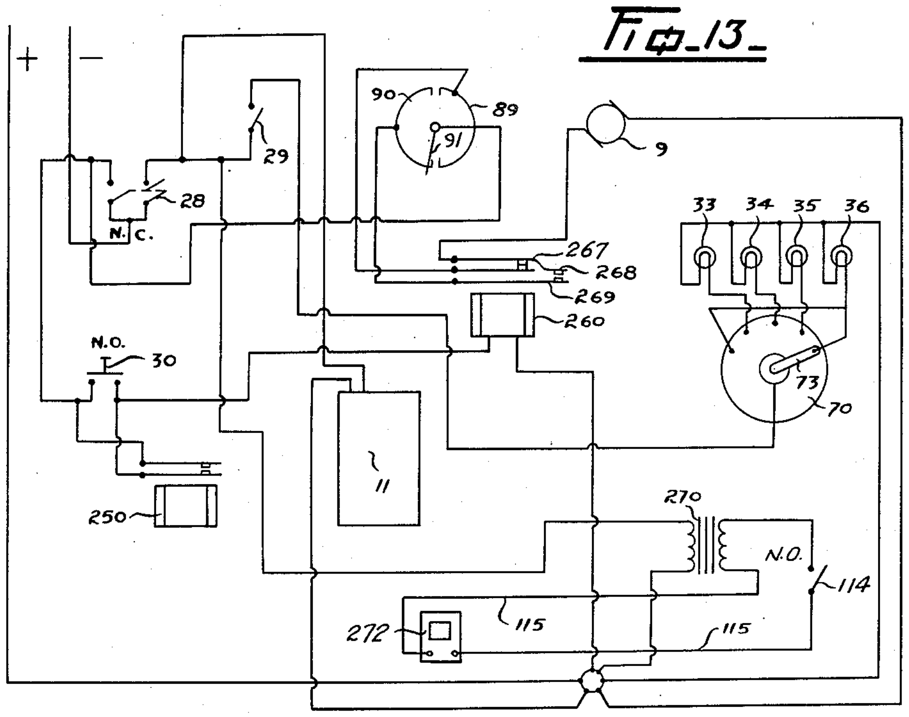
Figures 13 and 14 are wiring diagrams of the circuits controlling the timing mechanism and the circuits to the switches actuated by the various timing mechanisms.

The circuits shown in Figure 13 include the line voltage circuits to the motor 9; to the amplifier set 11; to the signal lamps 33, 34, 35 and 36; to the coil of the sound relay 250; to the arcuate contacts 89 and 90; to the low voltage transformer 270, and also to the circuit from the transformer to the buzzer 272.

It will be noticed that when the main switch 28 is closed, the current flows directly through the right arm of the switch to the amplifier, so that its tubes may constantly be heated.

Figure 6:
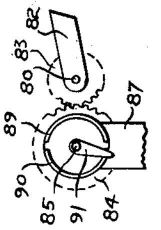
Figure 6 is a detail view showing the arcuate contacts of the timing drive and the telephone base lift arm.
Figure 14:
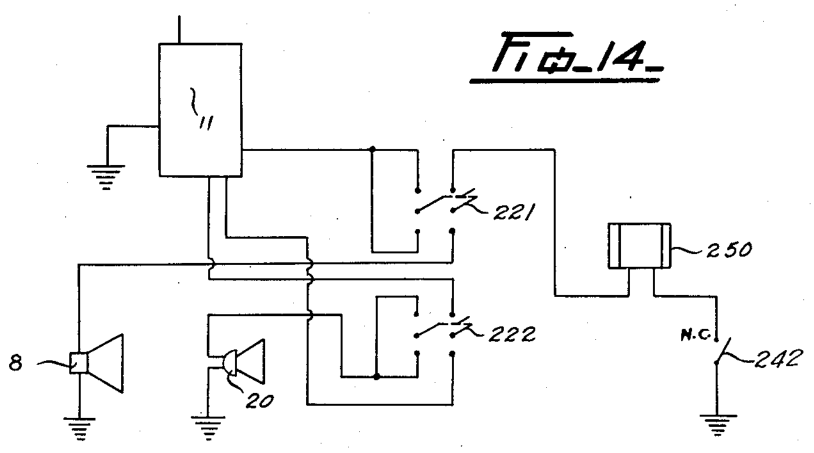
Figure 8:
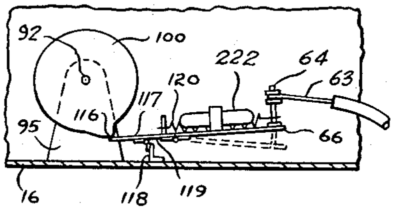
Figure 8 is an elevational view of the tripping means for the double pole double throw switches.
Figure 9:
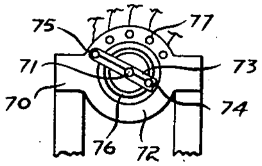
Figure 9 is an elevational view of the indicator light rotary switch.

At the completion of a telephone call cycle, the pointer 91 will come to rest upon one of the arcuate contacts 89 or 90, or as shown in Figures 6 and 13, on the contact 90 and on its entering end, which leaves the entire circuit through to the motor dead, but does not effect the circuit to the amplifier or that to the lights 33, 34, 35 and 36 which are ready to be closed through the switch 29. The current flow to the motor is always through one of the arcuate contacts 89 or 90 and through two of the blade contacts of the ratchet relay, so that when the pointer 91 has travelled from an energized arcuate contact 89 or 90 to a dead one the circuit becomes broken, so to close the circuit again the push button switch 30 may be pushed to open the recently closed blade contacts and close the recently open ones. If the relay 250 becomes energized by the ringing of the telephone bell, the relay will also actuate the contacts 267, 268 and 269 to change the current flow from one arcuate contact to the other and transmit current again to the motor 9. The diagram as shown in Figure 14 is of the circuits controlling the relay 250 and the switches to the microphone 20 and the speaker 8 and also the switch 242 for breaking the circuit to the relay immediately following a sound of the first stroke of the telephone call bell, not shown. The double pole double throw switches 221 and 222 are held, when the motor stops, tilted towards the cam 100 as shown in Figure 8, so that current may flow from a jack of the amplifier 11 through the switch 221 to the coil of the relay 250 and through the normally closed switch to ground. This circuit from the amplifier is closed within the amplifier in response to the first stroke of the bell of the telephone, as soon as the said relay coil is energized the motor circuit is closed by the closing of the contacts of relay 250, causing the switch 242 to be tilted to open by the governor 245 on the motor shaft. The immediate opening of the relay coil circuit to the relay 250 through the tilting of the switch 242 prevents any repetition of the bell signal and as the motor starts with its train of shafts and the rotation of the cam 100, the switch platform 119 will tilt away from the cam and the switch 221 will close the circuit from the amplifier to the speaker 8 and open the amplifier to relay coil circuit. The switch 222 is included in two circuits, one of which is along a wire from the amplifier through one end of the mercury switch to the microphone 20 and to ground, and the other circuit is along a second wire from the amplifier through the other end of the mercury switch to the microphone and to ground. When the switch 222 is held tilted as shown in Figure 8, an impulse picked up by the amplifier is used to energize the coil of relay, but when tilted as indicated in dotted line in Figure 8, or in the opposite way to that now described, it receives sound waves through said switch 222 from the microphone to be recorded by the user of the set onto the record tape, or to receive a message from the receiver of the handset which is resting on the microphone 20 also to be recorded on the tape for reproduction to the owner on his return to the office where his telephone instrument is installed.

Having thus described the several parts of our invention we will now describe its operation.

If the tape recorder 1 is to be used as such and not for receiving telephone messages, the main switch 28 is set in the "On" position and the transmission gear button 32 is raised to withdraw the idler 49 from meshing engagement with the pinion 45 and gear wheel 46 and to pull down the switch support plate 66, thus leaving the amplifier circuit closed and the motor circuit closed, or ready to be closed by pressing the push button switch 30 to cause the relay 260 to by pass the current through the proper arcuate contact 89 or 90 to the motor as previously described. When this is done by turning the appropriate knobs on the panel 1, dictation can be recorded or the recorded message be reproduced as desired. It is presumed that the shaft 44 will be left in the position shown in the various figures or with the cam 100 in position to start with its step 116 holding the switches 221 and 222 tilted towards said cam, which position is the end of the operating cycle. At predetermined intervals of the length of the tape 3, a message is recorded by the user of the device, which message will be to the effect that the party called is absent, but if the caller will leave his or her phone number, or a message, such message will be attended to later. The message gives advice to the caller to wait for the buzzer before speaking into his telephone transmitter. These messages remain on the tape and are not erased during the normal course of operation, and the interspaces between the "user" messages are adapted to receive messages from callers. When recording messages upon the tape to instruct a caller, the switch 29 should be closed. At the beginning of the cycle of operations the contact 75 of the finger 73 is closing the circuit to signal lamp 36, so that when recording a message to the "caller" on the tape, the operator can see when to start his message and as the finger 73 moves across the several contacts progressively lighting lamps 33, 34, 35 and 36, he will know how soon he must terminate his message, so that a subsequent message received from the caller will not overlay the message to caller then being recorded.

Figure 7:
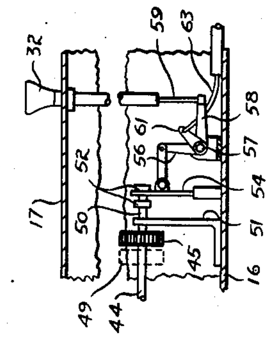
Figure 7 is a detail view of the mechanism for disengaging the drive from the main to the slow speed shaft.

To set the device to receive telephone calls, the transmission button 32 is pressed down to the position shown in Figure 7, which connects the driving train between the shaft 44 and the reduction gear 48 and allows the switches 221 and 222 to remain tilted as in Figure 8 and the main switch 28 is closed, which as before stated, allows the amplifier tubes to warm up.

Assuming the telephone base to be within its recess 18 and the button 25 thereof to be depressed, the device will be ready to receive and record telephone messages from outside. When the device is so set, there is no need for operation of the signal lamps, consequently the switch 29 may be opened. When the bell of the monophone rings, the amplifier circuit energizes the relay 250, which, through the main switch 28, starts the motor and causes the shafts 80, 92 and 101 to rotate one revolution, the radial arm 82 slips from platform supporting position, so that the telephone base can descend far enough to allow the button 25 to switch the telephone from the ringing to the talking circuit, so that as the amplifier 11 is then set to speak or listen, the message to caller is reproduced in close proximity to the transmitter of the telephone handset, so that the caller is instructed as to the user's absence and requested to leave the caller's message. When this instruction is over, the arm 98 actuates the switch to sound the buzzer 272 and almost simultaneously the arm 96 moves to switch the amplifier to erase and record, so that the message given by the caller is recorded on the tape 3. As the shaft 80 approaches the end of its revolution, the arm 82 lifts the platform 233, reseating the telephone handset on the base of the telephone and as the pointer 91 slips off the energized arcuate contact 89 or 90 onto the dead contact, the motor circuit is broken and the electronic circuits restored to position for sound waves from the telephone bell to close the line current circuits controlling the motor and other functions of the device.

The operation of the device as arranged in Figures 11 and 12 is as described, except that neither the telephone base or its handset is raised or lowered to switch from ringing to speaking circuits, but the switch button of the base is depressed and released by the finger 309.

What we claim as our invention is:

1. A telephone answering and recording device comprising in combination with a telephone of the handset type a recorder having an electric motor, an amplifier, a microphone and a speaker adapted to be energized from the amplifier, a line current circuit for the motor, a circuit for the amplifier, and a telephone to telephone exchange bell circuit, said device having a support for a telephone of the handset type, said recorder microphone being disposed in close proximity to the telephone receiver when said handset is upon its base, and the recorder speaker being disposed in close proximity with the transmitter of the telephone handset when said handset is upon its base, a sound relay having switch contacts, said sound relay being energized from the amplifier in response to a predetermined sound picked up by the microphone of the recorder to close the sound relay switch contacts to start the motor, and mechanical means for lowering the telephone base below the handset whereby the telephone to telephone exchange bell circuit is intercepted and the energizing current to the sound relay is cut off, said sound relay having a circuit including a normally closed switch, and means connected with the motor shaft adapted to open the normally closed switch in response to said motor attaining running speed, said normally closed switch serving when opened to prevent further predetermined sound pickup by the sound relay while the motor is running.

2. A telephone answering and recording device as claimed in claim 1, wherein the means connected with the motor shaft for opening the normally closed switch is a centrifugal governor and the switch is moved to open position by the action of said governor.

3. A telephone answering and recording device as claimed in claim 2, wherein a pivotally mounted platform is operatively connected to the governor to be tilted thereby and the normally closed switch is a mercury switch adapted to be moved to open position as the platform is tilted in response to the starting of the motor.

4. A telephone answering and recording device having a motor, a line current circuit therefor, an amplifier and a telephone bell sound relay adapted to be energized from the amplifier, a ratchet relay having a coil and contacts, said contacts being included in the line circuit to the motor, a pair of slightly spaced arcuate contacts in said motor circuit, said circuit having alternate paths through said arcuate contacts, a rotating pointer alternately engaging the arcuate contacts and said pointer being connected to one side of the motor circuit, said ratchet relay contacts being adapted to be alternately closed and opened as the sound relay and the ratchet relay coil are energized, each of said ratchet relay contacts being connected with an arcuate contact in the motor circuit, and mechanical means driven by the motor for rotating the pointer to move it along one arcuate contact and onto the other and to open said motor circuit as said pointer passes from one arcuate contact to the other.

References Cited in the file of this patent

UNITED STATES PATENTS

| | | |
|---|---|---|
| 1,778,980 | McKeldin et al. | Oct. 21, 1930 |
| 2,005,788 | Keiser | June 25, 1935 |
| 2,154,722 | Bloxsom | Apr. 18, 1939 |
| 2,261,420 | Shively et al. | Nov. 4, 1941 |
| 2,374,842 | Shively et al. | May 1, 1945 |
| 2,393,272 | Van Deventer | Jan. 22, 1946 |
| 2,533,234 | Edwards | Dec. 12, 1950 |
| 2,539,139 | Jordanoff et al. | Jan. 23, 1951 |
| 2,549,548 | Von Zimmermann | Apr. 17, 1951 |